(12) United States Patent
Weitzel et al.

(10) Patent No.: US 8,569,432 B2
(45) Date of Patent: Oct. 29, 2013

(54) SEMI-CONTINUOUS METHOD FOR EMULSION POLYMERISATION

(75) Inventors: Hans-Peter Weitzel, Reischach (DE); Robert Braunsperger, Emmerting (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 13/512,150

(22) PCT Filed: Jul. 7, 2011

(86) PCT No.: PCT/EP2011/061535
§ 371 (c)(1),
(2), (4) Date: Aug. 14, 2012

(87) PCT Pub. No.: WO2012/007354
PCT Pub. Date: Jan. 19, 2012

(65) Prior Publication Data
US 2012/0316287 A1    Dec. 13, 2012

(30) Foreign Application Priority Data

Jul. 14, 2010  (DE) .......................... 10 2010 031 338

(51) Int. Cl.
*B01J 19/18* (2006.01)
*C08F 210/02* (2006.01)
*C08F 218/04* (2006.01)

(52) U.S. Cl.
USPC .................. 526/67; 526/65; 526/68; 526/73; 526/78; 526/80; 526/87

(58) Field of Classification Search
USPC .................. 526/67, 65, 66, 68, 73, 78, 80, 87
See application file for complete search history.

(56) References Cited

U.S. PATENT DOCUMENTS

| 4,035,329 A | 7/1977 | Wiest et al. |
| 4,946,891 A | 8/1990 | Devona et al. |
| 2002/0035192 A1 | 3/2002 | Weitzel |
| 2003/0125451 A1 | 7/2003 | Weitzel et al. |

FOREIGN PATENT DOCUMENTS

| DE | 24 56 576 | | 8/1976 |
| DE | 19809220 A1 | * | 9/1999 |
| EP | 1 174 445 | | 1/2002 |
| EP | 1 323 752 | | 7/2003 |
| EP | 1323752 A1 | * | 7/2003 |
| EP | 1 352 915 | | 10/2003 |
| EP | 1352915 A1 | * | 10/2003 |
| EP | 1 266 909 | | 2/2008 |

OTHER PUBLICATIONS

Fox T. G., Bull. Am. Physics Soc. 1, 3, p. 123 (1956).
Polymer Handbook 2nd Edition, J. Wiley & Sons, New York (1975).

* cited by examiner

*Primary Examiner* — Kelechi Egwim
(74) *Attorney, Agent, or Firm* — RatnerPrestia

(57) ABSTRACT

A method for producing aqueous polymer dispersions by means of radically initiated emulsion polymerisation, in an aqueous medium, of vinyl ester and ethylene, in series-connected polymerisation reactors, wherein in a first discontinuous polymerisation phase at least some of the reactants are introduced into the first polymerisation reactor and the remainder is added in a metered fashion. The reactor is filled up to more than 90% by volume, and at least 90 wt % of the monomers are reacted; in a second continuous polymerisation phase, the reactants are continuously supplied to the first polymerisation reactor and product is continuously withdrawn, and the product is continuously transferred into a second polymerisation reactor, and in the second polymerisation reactor the polymerisation is continued until at least 98 wt % of the monomers used have reacted.

11 Claims, No Drawings

SEMI-CONTINUOUS METHOD FOR EMULSION POLYMERISATION

CROSS REFERENCE TO RELATED APPLICATIONS

This application is the national phase filing of international patent application No. PCT/EP2011/061535, filed 7 Jul. 2011, and claims priority of German patent application number 10 2010 031 338.6, filed 14 Jul. 2010, the entireties of which applications are incorporated herein by reference.

FIELD OF THE INVENTION

The invention relates to a process for preparing aqueous polymer dispersions by means of semicontinuous radically initiated emulsion polymerization of vinyl ester and ethylene, and optionally further ethylenically unsaturated comonomers.

BACKGROUND OF THE INVENTION

Aqueous dispersions based on vinyl acetate with further comonomers are prepared traditionally in a batch process. This procedure allows utmost flexibility for a broad product portfolio with small to medium-scale products; medium-scale here refers to a volume of up to 10 000 T per annum. For higher-volume products, continuous processes would also be considered. A disadvantage associated with the continuous process is the high output rate of the plant, which, while in principle desirable, makes this process unattractive for products having relatively small sales volumes, since the quantities produced are too great in too short a time and have to be stored. On the other hand, of course, even for relatively small-scale products, there is a need to increase productivity in the batch process, since the batch process is significantly less efficient than a continuous process.

The terms are defined here once again for clarification: Batch processes are discontinuous processes in which all of the reactants (apart from the initiators, or only portions of the initiators) are included in the initial charge, and only the initiators, or portions of the initiators, are metered in.

In the discontinuous semibatch process, the reactants are not included in their entirety in the initial charge; instead, also monomers and aqueous solutions/emulsions of protective colloids and/or emulsifiers are at least partly metered in.

In the continuous process, all of the reactants, after a starting phase (generally a batch operation), are metered continuously over a long time (several days to weeks) into the reactor or into a reactor cascade, and the product is withdrawn continuously.

Frequently in everyday language no distinction is made between batch and semibatch processes, and caution is therefore called for when discussing them. Moreover, frequently, the term "semicontinuous" is used in the literature for the process identified in this specification as "semibatch". The key characteristic of (semi)batch operation is that it is ended after complete filling of the reactor has been reached, and the reactor is emptied, and a new operation is started. The fundamental principle of a continuous operation, frequently in stirred tank cascades, is that the reaction components are fed continuously into the reactor and the polymerization product is withdrawn continuously at the same rate.

The continuous polymerization of vinyl acetate and ethylene is known and is widely described in the patent literature: DE-A 2456576 describes a process for the continuous polymerization of vinyl acetate-ethylene dispersions in a pressure reactor with downstream reaction tube. To prevent wall deposits and to ensure a uniform polymerization profile, the use is recommended of a redox initiator mixture containing a 3- to 10-fold excess of reducing agent.

EP 1174445 A1 describes a seed latex process for the continuous polymerization of vinyl ester-ethylene copolymers, in which the end product itself is used as a seed latex. Relatively coarse polymer particles, having a weight-average diameter of more than 1000 nm, are obtained.

EP 1323752 A1 describes a process for the continuous polymerization of protective-colloid-stabilized polymers on the basis of vinyl esters and ethylene. With polyvinyl alcohol used as protective colloid, dispersions having a weight-average diameter Dw of 800 to 1400 nm are obtained, the protective colloid being metered into both reactors.

A semicontinuous process combines the two fundamental principles of batch operation and of continuous operation. The reactor is started in discontinuous batch (or semibatch) operation until complete filling is reached. At the time point at which batch operation is ended on account of the attainment of complete filling (usually this is done ahead of this time point, in order to prevent what is termed liquid pressure), continuous operation begins, with material being supplied to and withdrawn from the reactor simultaneously. This second phase may in principle last for as long as is desired, but will in practice be guided by the volumes of the downstream storage containers.

A semicontinuous polymerization process is described in U.S. Pat. No. 4,946,891. That process describes the polymerization of vinyl acetate with other liquid monomers such as butyl acrylate. The object was to reduce the particle size of the emulsion polymers as compared with fully continuous operation, and to improve properties such as gloss and wet abrasion of emulsion paints. The polymerization is carried out under atmospheric pressure and the product is withdrawn by simple overflow of the reactor into a second vessel.

EP 1266909 B1 describes a semicontinuous process for emulsion polymerization for producing a bimodal product. In that process, the reactants are metered into a reactor and the batch is brought to polymerization temperature. Then surface-active agent or seed latex is added. When the reactor is full, product is withdrawn continuously from the reactor, at the same rate as that of the metered feed, and is collected in a second container. Operation is continued until the volume metered in the reactor is 1.05 to 2 times the reactor volume.

SUMMARY OF THE INVENTION

Against this background, the object was that of developing a polymerization process which is significantly more efficient than a batch process and yet avoids the disadvantages of a continuous process.

DETAILED DESCRIPTION OF THE INVENTION

The invention provides a process for preparing aqueous polymer dispersions by means of radically initiated emulsion polymerization, in aqueous medium, of vinyl ester and ethylene and optionally further ethylenically unsaturated comonomers, in polymerization reactors in series, characterized in that in a first, discontinuous polymerization phase, the reactants for the polymerization are included at least in part in an initial charge to the first polymerization reactor and the remainder is metered in, the polymerization being performed under a pressure p of 5 to 120 bar abs. and at a temperature T of 20° C. to 120° C., and with a degree of reactor filling of greater than 90% by volume and at a conversion of at least 90% by weight of the monomers used up until that point, in a second, continuous polymerization phase, the reactants are supplied continuously to the first polymerization reactor and product is withdrawn continuously from the first polymerization reactor, and the product is transferred continuously into a second polymerization reactor, and from this time point on, metering of reactant and withdrawal of product in the first polymerization reactor are controlled such that these amounts correspond to one another, and in the second polymerization reactor the polymerization is continued under a pressure p of <5 bar abs. through to a conversion of at least 98% by weight of the monomers used, based on the total weight of the amount of monomer used in the process.

Suitable vinyl esters are those of carboxylic acids having 1 to 12 C atoms. Preferred vinyl esters are vinyl acetate, vinyl propionate, vinyl butyrate, vinyl 2-ethylhexanoate, vinyl laurate, 1-methylvinyl acetate, vinyl pivalate, and vinyl esters of α-branched monocarboxylic acids having 9 to 11 C atoms, as for example VeoVa9® or VeoVa10® (trade names of Hexion). Particularly preferred is vinyl acetate. The stated vinyl esters are copolymerized in general in an amount of 30% to 90% by weight, based on the total weight of the monomers.

Ethylene is copolymerized in general in an amount of 1% to 40% by weight, preferably 10% to 30% by weight, based in each case on the total weight of the monomers.

Suitable further comonomers are those from the group of the esters of acrylic acid or methacrylic acid, the vinyl halides such as vinyl chloride, and the olefins such as propylene. Suitable methacrylic esters or acrylic esters are esters of unbranched or branched alcohols having 1 to 15 C atoms such as methyl acrylate, methyl methacrylate, ethyl acrylate, ethyl methacrylate, propyl acrylate, propyl methacrylate, n-butyl acrylate, n-butyl methacrylate, 2-ethylhexyl acrylate, and norbornyl acrylate. Preference is given to methyl acrylate, methyl methacrylate, n-butyl acrylate, and 2-ethylhexyl acrylate. These comonomers are optionally copolymerized in an amount of 1% to 40% by weight, preferably 1% to 20% by weight, based in each case on the total weight of the monomers.

Optionally it is possible to copolymerize 0.05% to 10% by weight as well, based on the total weight of the monomers, of auxiliary monomers. Examples of auxiliary monomers are ethylenically unsaturated monocarboxylic and dicarboxylic acids, preferably acrylic acid, methacrylic acid, fumaric acid, and maleic acid; ethylenically unsaturated carboxamides and carbonitriles, preferably acrylamide and acrylonitrile; and monoesters and diesters of fumaric acid and maleic acid such as the diethyl esters and diisopropyl esters, and also maleic anhydride, ethylenically unsaturated sulfonic acids and/or their salts, preferably vinylsulfonic acid and 2-acrylamido-2-methylpropanesulfonic acid. Further examples are pre-crosslinking comonomers such as polyethylenically unsaturated comonomers, as for example divinyl adipate, diallyl maleate, allyl methacrylate or triallyl cyanurate, or post-crosslinking comonomers, as for example acrylamidoglycolic acid (AGA), methylacrylamidoglycolic acid methyl ester (MAGME), N-methylolacrylamide (NMA), N-methylolmethacrylamide (NMMA), N-methylolallylcarbamate, alkyl ethers such as the isobutoxy ether or esters of N-methylolacrylamide, of N-methylolmethacrylamide, and of N-methylolallylcarbamate. Suitable auxiliary monomers are also monomers with hydroxyl or carboxyl groups, such as, for example, hydroxyalkyl esters of methacrylic acid and acrylic acid, such as hydroxyethyl, hydroxypropyl or hydroxybutyl acrylate or methacrylate, and also 1,3-dicarbonyl compounds such as acetoacetoxyethyl acrylate, acetoacetoxypropyl methacrylate, acetoacetoxyethyl methacrylate, acetoacetoxybutyl methacrylate, 2,3-di(acetoacetoxy)propyl methacrylate, and allyl acetoacetate.

Suitable auxiliary monomers are also epoxide-functional comonomers such as glycidyl methacrylate, glycidyl acrylate, allyl glycidyl ether, and vinyl glycidyl ether. Further examples of auxiliary monomers are siliconfunctional comonomers, such as acryloyloxypropyltri(alkoxy)- and methacryloyloxypropyltri(alkoxy)silanes, vinyltrialkoxysilanes, and vinylmethyldialkoxysilanes, preferably with alkyl and/or alkoxy groups each having 1 to 2 C atoms, as for example vinyltrimethoxysilane, vinyltriethoxysilane, and 3-methacryloyloxypropyltrimethoxysilane.

Preference is given to polymerizing comonomer mixtures which contain vinyl acetate and ethylene, more preferably 10% to 30% by weight of ethylene; and also comonomer mixtures containing 50% to 98% by weight of vinyl acetate and 1% to 40% by weight of ethylene, more preferably 10% to 30% by weight of ethylene, and preferably 1% to 20% by weight of one or more further comonomers from the group of the vinyl esters having 1 to 12 C atoms in the carboxylic acid radical, such as vinyl propionate, vinyl laurate, vinyl esters of alpha-branched carboxylic acids having 9 to 11 C atoms such as VeoVa9, VeoVa10, and VeoVa11; and comonomer mixtures of vinyl acetate with 1% to 40% by weight of ethylene, more preferably 10% to 30% by weight of ethylene, and preferably 1% to 20% by weight of (meth)acrylic esters of unbranched or branched alcohols having 1 to 15 C atoms, more particularly methyl acrylate, methyl methacrylate, ethyl acrylate, n-butyl acrylate, n-butyl methacrylate, hexyl acrylate or 2-ethylhexyl acrylate;

and comonomer mixtures of vinyl acetate, 1% to 20% by weight of vinyl laurate or vinyl esters of an alpha-branched carboxylic acid having 9 to 11 C atoms, and also 1% to 20% by weight of (meth)acrylic esters of unbranched or branched alcohols having 1 to 15 C atoms, more particularly methyl acrylate, methyl methacrylate, ethyl acrylate, n-butyl acrylate, n-butyl methacrylate, hexyl acrylate or 2-ethylhexyl acrylate, which additionally contain 1% to 40% by weight of ethylene, more preferably 10% to 30% by weight of ethylene; the stated comonomer mixtures may in each case further comprise the above-recited auxiliary monomers in the stated amounts, and the figures in % by weight in the comonomer mixtures, taking into account the auxiliary monomer fraction where appropriate, add up to 100% by weight in each case.

The monomer selection and the selection of the weight fractions of the comonomers are made such as to result in general in a glass transition temperature, Tg, of −50° C. to +50° C. The glass transition temperature, Tg, of the polymers may be determined in a known way by means of Differential Scanning calorimetry (DSC). The Tg may also be calculated approximately in advance, using the Fox equation. According to Fox T. G., Bull. Am. Physics Soc. 1, 3, page 123 (1956), it holds that: $1/Tg = x_1/Tg_1 + x_2/Tg_2 + \ldots + x_n/Tg_n$, where $x_n$ stands for the mass fraction (% by weight/100) of the monomer n, and $Tg_n$ is the glass transition temperature, in kelvins, of the homopolymer of the monomer n. Tg values for homopolymers are listed in Polymer Handbook, 2nd Edition, J. Wiley & Sons, New York (1975).

The polymerization is initiated preferably with the redox initiator combinations that are customary for emulsion polymerization. Examples of suitable oxidation initiators are the sodium, potassium, and ammonium salts of peroxodisulfuric acid, hydrogen peroxide, t-butyl peroxide, t-butyl hydroperoxide, potassium peroxodiphosphate, tert-butyl peroxopivalate, cumene hydroperoxide, isopropylbenzene monohydroperoxide, and azobisisobutyronitrile. Preference is given to the sodium, potassium, and ammonium salts of peroxodisulfuric acid and hydrogen peroxide. The stated initiators are used in general in an amount of 0.01% to 2.0% by weight, based on the total weight of the monomers.

Suitable reducing agents are the sulfites and bisulfites of the alkali metals and of ammonium, as for example sodium sulfite, the derivatives of sulfoxylic acid such as zinc or alkali metal formaldehyde-sulfoxylates, as for example sodium hydroxymethanesulfinate (Brüggolit), and (iso)ascorbic acid. It is preferred to use sodium hydroxymethanesulfinate and sodium sulfite. The amount of reducing agent is preferably 0.015% to 3% by weight, based on the total weight of the monomers.

The stated oxidizing agents, more particularly the salts of peroxodisulfuric acid, may also be used on their own as thermal initiators.

To control the molecular weight it is possible to use regulating substances during the polymerization. If regulators (chain-transfer agents) are used, they are employed typically in amounts of between 0.01% to 5.0% by weight, based on the total weight of the monomers, and are metered separately or else as a premix with reaction components. Examples of such substances are n-dodecyl mercaptan, tert-dodecylmercaptan, mercaptopropionic acid, methyl mercaptopropionate, isopropanol, and acetaldehyde. It is preferred not to use any regulating substances.

Surface-active substances suitable for the implementation of the emulsion polymerization are the emulsifiers and protective colloids that are customarily employed for these purposes.

Suitable protective colloids are polyvinyl alcohols; polyvinyl acetals; polyvinylpyrrolidones; polysaccharides in water-soluble form such as starches (amylose and amylopectin), celluloses and their carboxymethyl, methyl, hydroxyethyl, and hydroxypropyl derivatives; proteins such as casein or caseinate, soy protein, gelatin; lignosulfonates; synthetic polymers such as poly(meth)acrylic acid, copolymers of (meth)acrylates with carboxyl-functional comonomer units, poly(meth)acrylamide, polyvinylsulfonic acids, and the water-soluble copolymers thereof; melamine-formaldehyde sulfonates, naphthalene-formaldehyde sulfonates, and styrene-maleic acid and vinyl ether-maleic acid copolymers.

It is preferred to use partially hydrolyzed or fully hydrolyzed polyvinyl alcohols, more preferably from the group of the partially hydrolyzed polyvinyl alcohols having a degree of hydrolysis of 80 to 95 mol % and a Höppler viscosity, in 4% strength aqueous solution, of 1 to 30 mPas (Höppler method at 20° C., DIN 53015). Preference is also given to partially hydrolyzed, hydrophobically modified polyvinyl alcohols having a degree of hydrolysis of 80 to 95 mol % and a Höppler viscosity, in 4% strength aqueous solution, of 1 to 30 mPas. Examples thereof are partially hydrolyzed copolymers of vinyl acetate with hydrophobic comonomers such as isopropenyl acetate, vinyl pivalate, vinyl ethylhexanoate, vinyl esters of saturated alpha-branched monocarboxylic acids having 5 or 9 to 11 C atoms, dialkyl maleates and dialkyl fumarates such as diisopropyl maleate and diisopropyl fumarate, vinyl chloride, vinyl alkyl ethers such as vinyl butyl ether, and olefins such as ethene and decene. The fraction of the hydrophobic units is preferably 0.1% to 10% by weight, based on the total weight of the partially hydrolyzed polyvinyl alcohol. Mixtures of the stated polyvinyl alcohols can also be used. Further preferred polyvinyl alcohols are partially hydrolyzed, hydrophobized polyvinyl alcohols, which are obtained by polymer-analogous reaction, as for example acetalization of the vinyl alcohol units with $C_1$ to $C_4$ aldehydes such as butyraldehyde. The fraction of the hydrophobic units is preferably 0.1% to 10% by weight, based on the total weight of the partially hydrolyzed polyvinyl acetate. The degree of hydrolysis is from 80 to 95 mol %, preferably 85 to 94 mol %; the Höppler viscosity (DIN 53015, Höppler method, 4% strength aqueous solution) is from 1 to 30 mPas, preferably 2 to 25 mPas. Used with most preference in the process of the invention are polyvinyl alcohols having a degree of hydrolysis of 85 to 94 mol % and a Höppler viscosity, in 4% strength aqueous solution, of 3 to 25 mPas (Höppler method at 20° C., DIN 53015). The stated protective colloids are obtainable by means of processes known to the skilled person.

In the polymerization the protective colloids are added in general in an amount of 0% to 10% by weight, preferably 0.5% to 3% by weight, based on the total weight of the monomers.

Suitable emulsifiers are anionic, cationic, and nonionic emulsifiers. Emulsifiers used are preferably nonionic emulsifiers or anionic emulsifiers, or combinations of nonionic and anionic emulsifiers.

Suitable nonionic emulsifiers are, for example, acyl, alkyl, oleyl, and alkylaryl ethoxylates. These products are available commercially, for example, under the name Genapol® or Lutensol®. These include ethoxylated mono-, di-, and trialkylphenols, preferably having a degree of ethoxylation of 3 to 50 ethylene oxide units and $C_4$ to $C_{12}$ alkyl radicals, and also ethoxylated fatty alcohols, preferably having a degree of ethoxylation of 3 to 80 ethylene oxide units and $C_8$ to $C_{36}$ alkyl radicals. Suitable nonionic emulsifiers are also $C_{13}$-$C_{15}$ oxo-process alcohol ethoxylates having a degree of ethoxylation of 3 to 30 ethylene oxide units, $C_{16}$-$C_{18}$ fatty alcohol ethoxylates having a degree of ethoxylation of 11 to 80 ethylene oxide units, $C_{10}$ oxo-process alcohol ethoxylates having a degree of ethoxylation of 3 to 11 ethylene oxide units, $C_{13}$ oxo-process alcohol ethoxylates having a degree of ethoxylation of 3 to 20 ethylene oxide units, polyoxyethylenesorbitan monooleate having 20 ethylene oxide groups, copolymers of ethylene oxide and propylene oxide with at least 10% by weight ethylene oxide content, polyethylene oxide ethers of oleyl alcohol having a degree of ethoxylation of 4 to 20 ethylene oxide units, and the polyethylene oxide ethers of nonylphenol having a degree of ethoxylation of 4 to 20 ethylene oxide units.

Examples of suitable anionic emulsifiers are sodium, potassium, and ammonium salts of straight-chain aliphatic carboxylic acids having 12 to 20 C atoms; sodium hydroxyoctadecanesulfonate; sodium, potassium, and ammonium salts of hydroxy-fatty acids having 12 to 20 C atoms and the sulfonation and/or acetylation products thereof; sodium, potassium, and ammonium salts of alkyl sulfates, including those in the form of triethanolamine salts, and sodium, potassium, and ammonium salts of alkylsulfonates having in each case 10 to 20 C atoms and of alkylarylsulfonates having 12 to 20 C atoms; dimethyldialkylammonium chloride having 8 to 18 C atoms and the sulfonation products thereof; sodium, potassium, and ammonium salts of sulfosuccinic esters with aliphatic saturated monohydric alcohols having 4 to 16 C atoms and of sulfosuccinic acid 4-esters with polyethylene glycol ethers of monohydric aliphatic alcohols having 10 to 12 C atoms, more particularly the disodium salts thereof, and of sulfosuccinic acid 4-ester with polyethylene glycol nonylphenyl ether, more particularly the disodium salt thereof, and of biscyclohexyl sulfosuccinate, more particularly the sodium salt thereof; lignosulfonic acid and its calcium, magnesium, sodium, and ammonium salts; and resin acids, and also hydrogenated and dehydrogenated resin acids, and also their alkali metal salts.

The amount of emulsifier is preferably 3% to 10% by weight, based on the total weight of the monomers. It is also possible to use mixtures of nonionic and anionic emulsifiers, or else mixtures of the stated emulsifiers and protective colloids, in each case in the amounts specified above.

The polymerization is carried out generally in at least two polymerization reactors in series, preferably in a cascade of a pressure reactor followed by at least one low-pressure reactor. Pressure reactors and low-pressure reactors used may be the conventional, appropriately dimensioned steel reactors with stirring means, heating/cooling system, and lines for the supply of the reactants and removal of the products. The preferred plant configuration consists of a pressure reactor and a low-pressure reactor.

In the pressure reactor the polymerization is carried out under a pressure of typically 5 to 120 bar abs., preferably 10 to 80 bar abs. The polymerization temperature is generally 20° C. to 120° C., preferably 60° C. to 95° C.

In one preferred embodiment in the first, discontinuous polymerization phase, the vinyl ester monomers, ethylene, and optionally further comonomers and/or auxiliary monomers are included to an extent of at least 50% by weight in an initial charge to the pressure reactor, more preferably to an extent of 80% to 100% by weight, based in each case on the total weight of monomer added in the discontinuous phase.

The fraction of protective colloid and/or emulsifier used in the first, discontinuous polymerization phase is preferably included to an extent of 60% to 100% by weight in the initial charge, based on the total weight of protective colloid and/or emulsifier which is added in the discontinuous phase, and the remainder is metered in until the end of the discontinuous polymerization phase.

The initiator fraction which is used in the first, discontinuous polymerization phase is metered in preferably to an extent of at least 90% by weight, more preferably completely, based in each case on the total weight of initiator which is added in the discontinuous phase.

The discontinuous polymerization phase in the pressure reactor takes place typically until the critical degree of filling of the pressure reactor is greater than 90% by volume, preferably greater than 94% by volume. When the degree of filling approaches complete filling (100% by volume), there is a risk of overfilling and of a rapid increase in pressure as a result of what is termed hydraulic pressure or liquid pressure. The background to this is the fact that liquids, as is known, are much less compressible than gases. If the reactor is filled to the point that it is completely full of liquid, then the pressure rises sharply when further small amounts are added, and there is a great risk that the permitted plant pressure will be exceeded and a safety-relevant event occurs.

In order to avoid this, when the degree of filling exceeds 90% by volume, the line connection to the low-pressure reactor is opened. This connection is shut off with a pressure maintenance valve set to a pressure p. This pressure maintenance valve prevents overfilling of the pressure reactor. The pressure p is guided by the saturation pressure of the ethylene in the remaining reaction mixture at this time point. The solubility of ethylene in vinyl acetate is known and is described in the literature. At the time of transition to the second, continuous polymerization phase, and during the second continuous polymerization phase, the pressure p is preferably at least 5 bar above the saturation pressure, in order to dissolve the ethylene fully into the dispersion and to prevent a foam or gas cushion. Moreover, at the time of transition to the second, continuous polymerization phase and during the second continuous polymerization phase, the pressure p is preferably not more than 50 bar, more preferably not more than 20 bar, above the saturation pressure, since an increasing difference relative to the saturation pressure is accompanied by a decrease in the compressibility of the reactor contents and by a significant increase in the pressure sensitivity to fluctuations in metering, meaning that operational safety is difficult to ensure further.

Above a degree of filling of at least 90% by volume and a conversion of greater than 90% by weight in the discontinuous phase, the reactants composed of comonomers, protective colloids and/or emulsifiers, initiators, and also any other reactants, are metered continuously into the pressure reactor, and, simultaneously with this metering, an exactly equal mass of polymer dispersion is withdrawn from the pressure reactor and supplied to the low-pressure reactor. The mass flows supplied are controlled in a customary way, as for example via pumps with mass counters. The mass flowing off is controlled via a pressure regulator, which on exceedance of the predefined pressure p opens the withdrawal valve to an appropriate extent to allow the desired setpoint pressure to be maintained in the pressure reactor.

It is preferred if at the time point of the switch to the continuous polymerization phase, the polymerization conversion is at least 92% by weight of the monomers used up until that point, more preferably at least 95% by weight. At lower conversion rates, it is vital to return unreacted monomer into the operation, since otherwise the process would not be economic.

During the phase of continuous polymerization, care should be taken to ensure that at no time point does the conversion fall below 92% by weight, and more preferably that it is at least 95% by weight at any time point, based in each case on the total amount of the monomers metered in up to that point. The conversion rate can be controlled in a manner familiar to the skilled person, via the metering of the reactants and initiators. If the conversion rates fail to reach the specified minimum, it has been found that in the present pressure polymerization the incorporation of more volatile comonomers such as ethylene is inadequate, and disproportionately large amounts of this comonomer fraction are lost in the downstream low-pressure reactor.

In general the continuous polymerization phase is carried out at least until the amount by weight of reactants supplied in this phase corresponds at least to the amount by weight added during the first, discontinuous polymerization phase. The continuous polymerization phase is preferably operated such that in the same time period as in the discontinuous polymerization phase, at least the same amount of polymerization product is formed as the discontinuous polymerization phase. With particular preference the extent of the continuous polymerization phase corresponds to an extent of 100% to 400% by weight, more particularly 100% to 150% by weight, in each case of the batch size of the discontinuous polymerization phase. The doubling of the batch size is most preferred.

The amounts of product withdrawn from the pressure reactor are transferred continuously into, preferably, a correspondingly dimensioned low-pressure reactor. The volume of the low-pressure reactor is dependent on the length of time for which the continuous phase of the polymerization is carried out.

The low-pressure reactor is operated at a pressure of <5 bar abs., the pressure preferably being ≤1 bar abs. The temperature in the low-pressure reactor is 20° C. to 120° C. and is generally the same as or lower than the temperature in the pressure reactor. The polymerization in the low-pressure reactor is continued through to a conversion of at least 98% by weight of the monomers used. For this purpose it is possible for further initiator to be metered into the low-pressure reactor. Volatile residual monomers can also be removed by means of distillation, preferably under reduced pressure, with inert entraining gases such as air, nitrogen or steam being optionally passed through or over the reactor contents. The product obtained in the low-pressure reactor preferably has a residual monomer content of <1000 ppm.

In one preferred embodiment, unreacted monomer is recovered and recycled, in order to obtain a further increase in the economy of the process. This is done by condensation from the waste gas and optional redistillation of the corresponding monomers.

The aqueous dispersions obtainable with the process of the invention have a solids content of 30% to 75% by weight, preferably of 50% to 60% by weight.

From the aqueous polymer dispersions it is possible to obtain polymer powders which are redispersible in water. For preparing the water-redispersible polymer powders, the aqueous dispersions, optionally after addition of protective colloids as a spraying aid, are dried, by means of fluidized-bed drying, freeze drying or spray drying, for example. The dispersions are preferably spray-dried. This spray drying takes place in customary spray-drying plants, with atomization being accomplishable by means of one-fluid, two-fluid or multifluid nozzles or with a rotating disk. The exit temperature is generally selected in the range from 45° C. to 120° C., preferably 60° C. to 90° C., depending on plant, resin Tg, and desired degree of drying.

Generally speaking, the drying assistant (protective colloid) is used in a total amount of 3% to 30% by weight, based on the polymeric constituents (polymer fraction) of the dispersion. It is preferred to use 5% to 20% by weight, based on the polymer fraction.

Suitable drying assistants are partially hydrolyzed polyvinyl alcohols; polyvinylpyrrolidones; polysaccharides in water-soluble form such as starches (amylose and amylopectin), celluloses and their carboxymethyl, methyl, hydroxyethyl, and hydroxypropyl derivatives; proteins such as casein or caseinate, soy protein, gelatin; lignosulfonates; synthetic polymers such as poly(meth)acrylic acid, copolymers of (meth)acrylates with carboxyl-functional comonomer units, poly(meth)acrylamide, polyvinylsulfonic acids, and the water-soluble copolymers thereof; melamine-formaldehyde sulfonates, naphthalene-formaldehyde sulfonates, and styrene-maleic acid and vinyl ether-maleic acid copolymers. It is preferred not to use any protective colloids other than polyvinyl alcohols as drying assistants, and the polyvinyl alcohols that are preferred as protective colloids are also used with preference as drying assistants.

For improving the storage qualities through an improvement in the blocking stability, especially in the case of powders having a low glass transition temperature, the powder obtained may be treated with an antiblocking agent (anticaking agent), preferably at up to 30% by weight, based on the total weight of polymeric constituents. Examples of antiblocking agents are Ca and Mg carbonate, talc, gypsum, silica, kaolins, meta-kaolin, calcined kaolin, and silicates having particle sizes preferably in the range from 10 nm to 100 μm.

The aqueous polymer dispersions and the water-redispersible dispersion powders obtainable from them can be used in the fields of application that are typical for such dispersions and powders. For example, in chemical products for the construction industry, optionally in conjunction with hydraulically setting binders such as cements (portland, aluminate, pozzolanic, slag, magnesia, and phosphate cement), gypsum, and waterglass; for the production of construction adhesives, more particularly tile adhesives and adhesives for exterior insulation systems, plasters and renders, filling compounds, trowel-applied flooring compounds, leveling compounds, grouts, jointing mortars, and paints, and for modifying concrete. Additionally, as binders for coating materials and adhesives or as coating materials or binders for textiles and paper.

The advantages of the semicontinuous polymerization process of the invention in comparison to a discontinuous batch operation lie especially in the increase in productivity: For a typical discontinuous (batch) polymerization, with 2 h for preparatory work, 6 h for polymerization, and 2 h for work-up, when the batch size is doubled from 20 t to 40 t, the productivity increase is approximately 25% in a semicontinuous process if the continuous polymerization phase is operated such that a further 20 t of product are produced in a further 6 h batch: 20 t in 10 h=>2 t/h semicont.: 40 t in 16 h=>2.5 t/h When the discharge is tripled, the specific output is 2.7 t/h (+36%); if it is increased fivefold, the specific output is 2.94 t/h (+47%). This shows that the greatest relative benefit occurs for a doubling.

The advantage of the semicontinuous process of the invention in comparison to the fully continuous operation is that with the semicontinuous operation the amounts produced are only 2 to 5 times the customary batch size, after which, if desired, a changeover of product can be made in the plant. In the fully continuous operation, the switch from one product to another is not readily possible, and more particularly is not objectively useful if it is to occur with great frequency in order to keep the quantities produced at a low level.

The examples below serve for further illustration of the invention:

COMPARATIVE EXAMPLE 1

Polyvinyl Alcohol-Stabilized Dispersion in Batch Mode

A pressure reactor (volume: 570 liters) was initially charged with 95.5 kg of a polyvinyl alcohol having a Höppler viscosity in a 4% strength by weight solution of 4 mPas, and having a degree of hydrolysis of 88 mol %. In addition to this, 224 kg of vinyl acetate and 101.5 kg of deionized water were included in the initial charge. The reactor was brought to a pressure of 21 bar and a temperature of 55° C. (corresponding to an amount of ethylene of 18.5 kg), and the polymerization was started by commencement of the initiator feeds of tert-butyl hydroperoxide (3% by weight in water) and ascorbic acid (5% by weight in water), each at 750 g/h. On commencement of the reaction, evident from an increase in temperature, the reaction temperature was raised, with the aid of the heat of polymerization liberated, to 90° C., and the pressure was raised to 44 bar. The initiator feeds were reduced to 350 g/h each. 45 minutes after the commencement of reaction, further feeds were started: 40 kg/h of vinyl acetate for a duration of 90 minutes (corresponding to 60 kg of vinyl acetate), and 22 kg/h of a 10.6% strength by weight aqueous polyvinyl alcohol solution, having a Höppler viscosity in a 4% strength by weight solution of 4 mPas, and having a degree of hydrolysis of 88 mol %, for a duration of 120 minutes (corresponding to an amount of 44 kg). Ethylene was added additionally at a setpoint pressure of 44 bar, until the total amount of ethylene was 34 kg.

After the end of the metered feeds, the initiator feeds were continued for 30 minutes, at 1300 g/h in each case, with the pressure dropping to 20 bar (time 1). The batch was subsequently cooled to 65° C. and transferred into an unpressurized reactor (low-pressure reactor), where it is postpolymerized under a pressure of 700 mbar abs. by addition of 1 kg of tert-butyl hydroperoxide solution (10% by weight in water) and 2 kg of ascorbic acid solution (5% by weight in water).

The dispersion obtained had a solids content of 59% by weight, a viscosity of 1800 mPas (Brookfield, 20, 23° C.), and a glass transition temperature Tg of 15.0° C. The average of the weight-average particle size distribution Dw of the dispersion was 1450 nm (specific surface area: 5.2 $m^2/g$).

EXAMPLE 2

Polyvinyl Alcohol-Stabilized Dispersion in a Semicontinuous Process

The procedure as in comparative example 1 was repeated identically up until time point 1. At this time point, the dispersion had a free vinyl acetate content of about 2.0% by weight (measured by gas chromatography), corresponding to a polymerization conversion of approximately 96% by weight. The degree of filling of the reactor was about 92% by volume.

Starting from this time point, the following metered feeds were commenced: 130 kg/h of vinyl acetate for a duration of 145 minutes (amount 313 kg), and 82 kg/h of a 10.6% strength by weight aqueous polyvinyl alcohol solution, having a Happier viscosity in a 4% strength by weight solution of 4 mPas, and having a degree of hydrolysis of 88 mol %, for a duration of 145 minutes (corresponding to an amount of 198 kg). Ethylene was added additionally at a rate of 14 kg/h until the amount of ethylene was 34 kg. The initiator feeds are further metered, each at 1300 g/h. As a result of the newly establishing feeds, the reactor pressure rose again.

When the reactor pressure reached 30 bar, transfer to the unpressurized reactor (low-pressure reactor) was commenced. The transfer rate here was selected such as to allow the pressure in the pressure reactor to be maintained at a constant level of 30 bar. The pressure in the low-pressure reactor was set at 700 mbar abs. After the end of the monomer feeds, the initiator feeds were continued for 30 minutes more, each at 1300 g/h. The batch was subsequently cooled to 65° C. and transferred into the low-pressure reactor, where it was combined with the dispersion already transferred. The mixture was then postpolymerized under a pressure of 700 mbar abs. by addition of 2 kg of tert-butyl hydroperoxide solution (10% by weight in water) and 4 kg of ascorbic acid solution (5% by weight in water).

The dispersion obtained had a solids content of 60% by weight, a viscosity of 1915 mPas (Brookfield, 20, 23° C.) and a glass transition temperature Tg of 15.0° C. The average of the weight-average particle size distribution Dw of the dispersion was 1650 nm (specific surface area: 4.5 $m^2/g$).

The dispersions from comparative example 1 and example 2 were converted by spray drying into dispersion powders. For this purpose, the dispersions from comparative example 1 and example 2, in each case after addition of 7% by weight, based in each case on polymer, of a polyvinyl alcohol having a degree of hydrolysis of 88 mol % and a Höppler viscosity of 4 mPas, were sprayed using a two-fluid nozzle. The spraying component used was precompressed air at 4 bar, and the droplets formed were dried with a co-current flow of air heated to 125° C. The dry powder obtained was admixed with 12% by weight of commercially customary antiblocking agent (calcium carbonate).

Determining the tensile adhesive strengths of a cementitious tile adhesive modified with the dispersion powders:

The tensile adhesive strengths in the tile adhesive were tested in the following dry mortar formula (4% by weight polymer fraction):

| | |
|---|---|
| quartz sand | 555 parts |
| portland cement | 400 parts |
| cellulose | 5 parts |
| dispersion powder | 40 parts |

This dry mixture is made up with water with stirring in each case.

The tensile adhesive strengths were ascertained according to 3 sets of storage conditions:
28 D: 28 days' dry storage under standard conditions (DIN 50014, 23° C., 50% humidity)
7 D/21 W: 7 days' dry storage under standard conditions/21 days wet storage in water at 23° C.
14 D/14 DS+70° C./1 D: 14 days' dry storage under standard conditions/14 days' hot storage at 70° C./1 day's dry storage under standard conditions For the determination of the tensile adhesive strength, the mortar was applied to a thickness of 3 mm with a trowel and with a stencil measuring 5×5 $cm^2$ to a concrete substrate, and the tiles were adhered. This was followed by storage as described above. After the storage period, metal plates, serving as tensile anchors for the measurements, were adhered to the tiles using epoxy adhesive. The tensile adhesion values were determined using a pull-off device from Herion. The measurement values in $N/mm^2$ represent an average formed from 3 measurements.

The results of this test are summarized in table 1 below.

| Example | 28 D [$N/mm^2$] | 7 D/21 N [$N/mm^2$] | 14 D/14 DS + 70/1 D [$N/mm^2$] |
|---|---|---|---|
| Powder C1 | 1.43 | 0.88 | 1.21 |
| Powder 2 | 1.68 | 0.75 | 1.62 |

From the data it is evident that the polymer properties are better on the whole for the product produced with the inventive semicontinuous process (powder 2) than those of the product obtainable with the discontinuous process (powder C1).

COMPARATIVE EXAMPLE 3

Polyvinyl Alcohol/Emulsifier-Stabilized Polymer Dispersion in Batch Process

A pressure reactor (volume: 570 liters) was charged with the following substances:

88 kg of deionized water, 19.2 kg of a 40% strength by weight emulsifier solution 1 of isotridecyl alcohol polyglycol ether having a degree of ethoxylation of 15 (Genapol X150), 4.8 kg of a 30% strength by weight emulsifier solution 2 of alkanesulfonate sodium salt (Mersolat), 2.18 kg of vinyl sulfonate, 16.1 kg of a 10% strength by weight aqueous polyvinyl alcohol solution, having a Höppler viscosity in a 4% strength by weight solution of 25 mPas, and having a degree of hydrolysis of 88 mol %, and 27.2 kg of vinyl acetate. The pH of this mixture was adjusted to 5.0 with formic acid. The reactor was brought to a pressure of 27 bar and a temperature of 70° C. (corresponding to an amount of ethylene of 13 kg), and the reaction was started by commencement of the initiator feeds of ammonium persulfate solution (10% by weight in water) and sodium sulfite solution (4% by weight in water), at 780 g/h and 1400 g/h, respectively. 10 minutes after the start of reaction, additional metered feeds were commenced:

56 kg/h of vinyl acetate for a duration of 240 minutes (corresponding to 224 kg of vinyl acetate), 15.7 kg/h of an aqueous solution consisting of 36 kg of deionized water, 14 kg of emulsifier solution 1, and 12.8 kg of a 10% strength by weight aqueous polyvinyl alcohol solution, having a Happier viscosity in a 4% strength by weight solution of 25 mPas, and having a degree of hydrolysis of 88 mol %, for a duration of 240 minutes (corresponding to an amount of 62.8 kg), and 5.2 kg/h of a mixture of 0.8 kg of vinyltrimethoxysilane and 16.3 kg of vinyl acetate. Ethylene was metered in with a setpoint pressure of 25 bar, until the total amount of ethylene was 35 kg. The initiator feeds were increased in line with the start of the metered feeds, to 1900 g/h of ammonium persulfate solution and 3500 g/h of sodium sulfite solution. After the end of the metering of the mixture of vinyltrimethoxysilane/vinyl acetate, additionally, 7 kg of a mixture of 1.5 kg of glycidyl methacrylate and 5.5 kg of vinyl acetate were metered in at a rate of 10 kg/h. After the end of all the monomer feeds, the initiator solutions were metered in for 60 minutes more, during which the pressure dropped to 22 bar (time point 1).

The batch was subsequently cooled to 60° C. and transferred to an unpressurized reactor, where it was postpolymerized under a pressure of 700 mbar by addition of 1.5 kg of tert-butyl hydroperoxide solution (10% by weight in water) and 2.6 kg of sodium sulfite solution (4% by weight in water).

The dispersion obtained had a solids content of 57.9% by weight, a viscosity of 4440 mPas (Brookfield, 20, 23° C.) and a glass transition temperature Tg of 8° C. The average of the weight-average particle size distribution Dw of the dispersion was 480 nm (specific surface area: 16 m²/g).

EXAMPLE 4

Polyvinyl Alcohol/Emulsifier-Stabilized Polymer Dispersion in a Semicontinuous Process The procedure of comparative example 3 was repeated identically up until time point 1. At this time point, the dispersion had a free vinyl acetate content of approximately 2.5% by weight (measured by gas chromatography), corresponding to a polymerization conversion of about 95% by weight. The degree of filling of the reactor was about 91% by volume.

From this time point, the following metered feeds were commenced:

62.8 kg/h of vinyl acetate for a duration of 240 minutes (amount 251 kg) and 48 kg/h of an aqueous mixture of 123 kg of deionized water, 33.2 kg of emulsifier solution 1, 4.8 kg of emulsifier solution 2, 2.18 kg of vinyl sulfonate, 28.9 kg of a 10% strength by weight aqueous polyvinyl alcohol solution, having a Höppler viscosity in a 4% strength by weight solution of 25 mPas, and having a degree of hydrolysis of 88 mol %, for a duration of 240 minutes (corresponding to an amount of 192 kg), and 5.2 kg/h of a mixture of 0.8 kg of vinyltrimethoxy silane and 16.3 kg of vinyl acetate. After the end of the metering of the mixture of vinyltrimethoxysilane/vinyl acetate, additionally, 7 kg of a mixture of 1.5 kg of glycidyl methacrylate and 5.5 kg of vinyl acetate were metered in at a rate of 10 kg/h. Ethylene was metered in at a rate of 10 kg/h until the amount of ethylene was 35 kg. The metered initiator feeds were continued at 1900 g/h of ammonium persulfate solution and 3500 g/h of sodium sulfite solution.

As a result of the newly introduced feeds, the reactor pressure rose again. When a reactor pressure of 35 bar was reached, continuous product transfer to the low-pressure reactor was commenced. The transfer rate selected here was such that the pressure in the pressure reactor could be maintained at a constant level of 35 bar. The pressure in the low-pressure reactor was adjusted to 700 mbar abs.

After the end of the monomer feeds (time point 2), the metered initiator feeds were continued for 60 minutes at 1900 g/h of ammonium persulfate solution and 3500 g/h of sodium sulfite solution. The batch was then cooled to 60° C. in the pressure reactor and transferred to the low-pressure reactor, where it was combined with the dispersion already transferred. The mixture was then postpolymerized under a pressure of 700 mbar by addition of 3 kg of tert-butyl hydroperoxide solution (10% by weight in water) and 5.2 kg of sodium sulfite solution (4% by weight in water).

The dispersion obtained had a solids content of 60.2% by weight, a viscosity of 4300 mPas (Brookfield, 20, 23° C.), and a glass transition temperature of 5° C. The average of the weight-average particle size distribution Dw of the dispersion was 640 nm (specific surface area: 13 m²/g).

EXAMPLE 5

Example 4 was reproduced identically to obtain information on reproducibility.

EXAMPLE 6

Example 4 was repeated identically until time point 2 was reached.

At this time point, the following metered feeds were continued:

62.8 kg/h of vinyl acetate for a duration of 240 minutes (amount 251 kg) and 48 kg/h of an aqueous mixture of 123 kg of deionized water, 33.2 kg of emulsifier solution 1, 4.8 kg of emulsifier solution 2, 2.18 kg of a vinyl sulfonate, 28.9 kg of a 10% strength by weight aqueous polyvinyl alcohol solution, having a Höppler viscosity in a 4% strength by weight solution of 25 mPas, and having a degree of hydrolysis of 88 mol %, for a duration of 240 minutes (corresponding to an amount of 192 kg), and 5.2 kg/h of a mixture of 0.8 kg of vinyltrimethoxy silane and 16.3 kg of vinyl acetate. After the end of the metering of the mixture of vinyltrimethoxysilane/vinyl acetate, additionally, 7 kg of a mixture of 1.5 kg of glycidyl methacrylate and 5.5 kg of vinyl acetate were metered in at a rate of 10 kg/h.

Ethylene was metered in at a rate of 10 kg/h until the amount of ethylene was 40 kg. The metered initiator feeds were continued at 1900 g/h of ammonium persulfate solution and 3500 g/h of sodium sulfite solution.

After the end of the monomer feeds, the metered initiator feeds were continued for 60 minutes at 1900 g/h of ammonium persulfate solution and 3500 g/h of sodium sulfite solution. The batch was then cooled to 60° C. and transferred to the low-pressure reactor, where it was combined with the dispersion already transferred. The mixture was then postpolymerized under a pressure of 700 mbar by addition of 4.5 kg of tert-butyl hydroperoxide solution (10% by weight in water) and 7.8 kg of sodium sulfite solution (4% by weight in water).

The dispersion obtained had a solids content of 60.6% by weight, a viscosity of 5100 mPas (Brookfield, 20, 23° C.), and a glass transition temperature Tg of 6° C. The average of the weight-average particle size distribution Dw of the dispersion was 700 nm (specific surface area: 12 m²/g).

EXAMPLE 7

Example 6 was reproduced identically to obtain information on reproducibility.

The dispersions from comparative example and from examples 4, 5, 6, and 7 were investigated in respect of their performance in interior paints.

Formulas of the silicate-rich paint (paint formula 1) and carbonate-rich paint (paint formula 2) are described in table 2.

| Paint formula 1 (PF1) | | Paint formula 2 (PF2) | |
|---|---|---|---|
| Constituent | Weight fraction | Constituent | Weight fraction |
| Water | 300 | Water | 423 |
| Cellulose ether (Tylose H 6000 YP) | 6 | Cellulose ether (Tylose H 6000 YP) | 6 |
| Dispersant (Dispex N 40) | 5 | Dispersant (Dispex N 40) | 5 |
| Dispersant (Calgon N) | 5 | Dispersant (Calgon N) | 5 |
| Sodium hydroxide (10% in water) | 1 | Sodium hydroxide (10% in water) | 1 |
| Preservative (Hydrol W) | 1 | Preservative (Hydrol W) | 1 |
| Defoamer (Agitan 260) | 4 | Defoamer (Agitan 260) | 4 |
| Magnesium silicate (Talkum N) | 30 | Magnesium silicate (Talkum N) | 80 |
| Titanium dioxide pigment (Kronos 2300) | 250 | Titanium dioxide pigment (Kronos 2300) | 100 |
| Aluminum silicate, precipitated (P 820) | 50 | Calcium carbonate (Omyacarb 2 GU) | 70 |
| Aluminum silicate (China-Clay B) | 100 | Calcium carbonate (Omyacarb 5 GU) | 70 |
| Calcium carbonate, precipitated (Socal P2) | 13 | Calcium carbonate, precipitated (Socal P2) | 70 |
| Dolomite (Microdol 1) | 30 | Dolomite (Microdol 1) | 50 |
| Polymer dispersion (55%) | 200 | Polymer dispersion (55%) | 110 |
| Defoamer (Agitan 260) | 5 | Defoamer (Agitan 260) | 5 |
| Sum of all parts by weight | 1000 | Sum of all parts by weight | 1000 |

Determining the wet abrasion:

The wet abrasion resistance of both formulas was tested using the pad method (ISO 11998). The erosion of the coating after 200 scrub cycles was determined by the loss of mass of the paint film. The paint density, the abraded area, and the loss of mass of the paint film were used to calculate the paint erosion (wet abrasion) in The results are compiled in table 3.

TABLE 3

| Example | WA PF 1 [μm] | WA PF 2 [μm] |
|---|---|---|
| C3 | 18.2 | 3.7 |
| 4 | 16.6 | 4.4 |
| 5 | 18.9 | 4.2 |
| 6 | 17.9 | 3.9 |
| 7 | 19.5 | 4.3 |

It is apparent that the procedure in accordance with the invention yields performance comparable with that of the discontinuous standard process in batch mode.

The invention claimed is:

1. A process for preparing aqueous polymer dispersions by means of radically initiated emulsion polymerization, in aqueous medium, of vinyl ester and ethylene and optionally further ethylenically unsaturated comonomers, in polymerization reactors in series, wherein
in a first, discontinuous polymerization phase, the reactants for the polymerization are included at least in part in an initial charge to the first polymerization reactor and the remainder is metered in, the polymerization being performed under a pressure p of 5 to 120 bar abs. and at a temperature T of 20° C. to 120° C.,
and with a degree of reactor filling of greater than 90% by volume and at a conversion of at least 90% by weight of the monomers used up until that point, in a second, continuous polymerization phase, the reactants are supplied continuously to the first polymerization reactor and product is withdrawn continuously from the first polymerization reactor, and the product is transferred continuously into a second polymerization reactor, and from this time point on, metering of reactant and withdrawal of product in the first polymerization reactor are controlled such that these amounts correspond to one another, and in the second polymerization reactor the polymerization is continued under a pressure p of < 5 bar abs. through to a conversion of at least 98% by weight of the monomers used, based on the total weight of the amount of monomer used in the process.

2. The process of claim 1, wherein the second continuous polymerization phase is initiated when a pressure p established in the first polymerization reactor is 5 to 50 bar above the saturation pressure of ethylene in the reaction mixture present.

3. The process of claim 1, wherein the emulsion polymerization is carried out in a cascade of a first pressure reactor and subsequently at least one second low-pressure reactor.

4. The process of claim 1, wherein in the first, discontinuous polymerization phase, the vinyl ester monomers, ethylene, and optionally further comonomers and/or auxiliary monomers are included to an extent of at least 50% by weight in an initial charge to the pressure reactor, based on the total weight of monomer added in the discontinuous phase,
and the fraction of protective colloid and/or emulsifier used in the first, discontinuous polymerization phase is included to an extent of 60% to 100% by weight in the initial charge.

5. The process of claims 1, wherein at no time point during the phase of continuous polymerization does the conversion fall below 92% by weight, based on the total amount of the monomers metered in up to that point.

6. The process of claims 1, wherein the continuous polymerization phase is carried out at least until the amount by weight of reactants supplied in this phase corresponds at least to the amount by weight of reactants added during the first, discontinuous polymerization phase.

7. The process of claims 1, wherein the extent of the continuous polymerization phase corresponds to 100% to 400% by weight of the batch size of the discontinuous polymerization phase.

8. The process of claims 1, wherein the continuous polymerization phase is operated such that in the same time period as in the discontinuous polymerization phase, at least the same amount of polymerization product is formed as in the discontinuous polymerization phase.

9. The process of claims 1, wherein product obtained in the low-pressure reactor has a residual monomer content of < 1000 ppm.

10. The process of claims 1, wherein pressure during the continuous polymerization phase in the first polymerization reactor is 5 to 20 bar above the saturation pressure of ethylene in the reaction mixture present.

11. The process of claims 1, wherein the aqueous polymer dispersion obtained in this process is further processed by drying to form a water-redispersible polymer powder.

* * * * *